United States Patent [19]

van der Hoorn et al.

[11] Patent Number: 4,779,307
[45] Date of Patent: Oct. 25, 1988

[54] DEVICE FOR CUTTING OPEN THE CARCASS OF A SLAUGHTER ANIMAL

[75] Inventors: Rudolf J. G. A. van der Hoorn; Marcelles B. M. Douwes, both of Nuenen, Netherlands

[73] Assignee: Nederlandse Centrale Organisatie voor Toegepast Natuurwetenschappelijk Onderzoek, Den Haag, Netherlands

[21] Appl. No.: 92,365

[22] Filed: Sep. 2, 1987

[30] Foreign Application Priority Data

Sep. 2, 1986 [NL] Netherlands .................. 8602219

[51] Int. Cl.⁴ .................................. A22B 5/20
[52] U.S. Cl. ..................................... 17/23
[58] Field of Search ............... 17/23; 30/276, 388

[56] References Cited

U.S. PATENT DOCUMENTS

| | | | |
|---|---|---|---|
| 1,492,333 | 4/1924 | Law et al. | 17/23 |
| 1,699,695 | 1/1929 | Feister | 17/23 |
| 4,087,886 | 5/1978 | Aubert | 17/23 X |

Primary Examiner—Willie G. Abercrombie
Attorney, Agent, or Firm—John Gibson Semmes

[57] ABSTRACT

Device for cutting through the pubis of the carcass of a slaughter animal, having on a slaughter yoke with a positioning element surrounded by a rotating circular first cutting element, a second cutting element and a sensor for locating the pubis position, combined into a functional unit, the movement of the positioning element being independently of same of the other elements.

8 Claims, 4 Drawing Sheets

FIG:2.

DEVICE FOR CUTTING OPEN THE CARCASS OF A SLAUGHTER ANIMAL

BACKGROUND OF THE INVENTION

The invention relates to a device for cutting through the pubis of the carcass of a slaughter animal, in particular a pig suspended by the legs from a slaughter yoke, comprising a positioning element carried by a bar and to be inserted into the anus by a movement in the lengthwise direction, a first cutting element which is disposed concentrically around it, is displaceable in the lengthwise direction, is rotary, and has an end cutting edge which carries out a circular movement for cutting off the rectum and a second, blade-type, cutting element, also driven in the direction of the anus, for cutting through the pubis.

DESCRIPTION OF THE PRIOR ART

A device of this kind is known per se from NL-A-No. 7 606 104, which has been laid open for public inspection (corresponding to U.S. Pat. No. 4,807,886 and GB-A-No. 1 549 886).

The processing to be carried out with this known device comprises two steps: in a first phase the rectum is cut away with the rotary cutting knife, following which the carcass is taken to a second position, in which the pubis is cleaved with a cleaverknife driven in the longitudinal direction. This known device has the disadvantage that not only does the total processing take place in two steps, but also that during the cleaving operating dung, still present in the rectum can escape, and can contaminate the carcass; besides, during the cleaving operation, in which considerable forces are exerted on the carcass, there is no fixation of the carcass or the pubis in lateral direction, so that the pubis is often cleaved at an arbitrary place and not at the cartilage in the middle; this leads to splintering, and a speedy locally blunting of the blade of the cleaverknife.

SUMMARY OF THE INVENTION

The object of the invention is to eliminate these disadvantages and to provide a device by means of which the operation can be carried out in a single step, quickly and reliably, without the risk of contamination of parts of the carcass.

This object is achieved in that the positioning element, the first cutting element and the second cutting element together with a sensor coupled to said second element for locating the pubis position are combined to a functional unit which can be moved in its entirety to and from the carcass, the movement of the positioning element being controllable independently of those of the other elements, in such a way that during the cutting stroke of the cutting blade it remains in the rectum sealing it off.

The measures according to the invention result in the advantage that the carcass need be positioned only once and, since the rectum is closed off during the operation, there is no danger of dung escaping and thereby contaminating the carcass. Through the vacuum applied during the cutting, the rectum is drawn up and stretched, as a result of which less damage occurs. The fixing of the vertebral column by means of mandrel and sensor achieved with the invention ensures that the cut will always be made at the correct place, i.e. through the easily cut cartilage, which increases the lifetime of the cleaver. The device takes up less space than the two processing stations which are needed in the known device, and the work can be completed in a shorter time.

Preferably the cutting blade which can move independently of the positioning element to and from the carcass is a rotary driven circular cutting blade which is enclosed by wedge-shaped locating cams, tapering towards the blade, movable independently thereof and constituting the sensor and is the positioning element ball-shaped.

The device preferably comprises two pressure members each carried by a tilting arm hinged to the unit and springloaded in the direction of the first cutting element. This measure ensures that the rectum is always correctly positioned with respect to the first cutting element.

It is advantageous when the device comprises a pressure strip below the first cutting element, carried by a sliding element guided in the unit for movement to and from the carcass parallel with the movement of the first cutting member. This measure ensures that the tail of the carcass is always out of the path of the first cutting element.

In a preferred embodiment the frontside of the first cutting element is tightly enclosed by a protective sleeve, which is movable jointly therewith to and from the carcass, and that means are provided for the creation of vacuum behind the positioning element and around the carrier the positioning element.

While preferably the functional unit carrying the positioning element and the two cutting elements is disposed in such a way that it is movable in the lengthwise direction, on the end of an oblong carrier, which at the other end is supported in such a way that it can rotate about a horizontal axis and in angular position can be set in the vertical plane, while a supporting bracket is provided thereunder, having one end mounted so as to be rotatable about a horizontal axis and also being adjustable in angular position, the other end enclosing the carcass.

Figure 1:
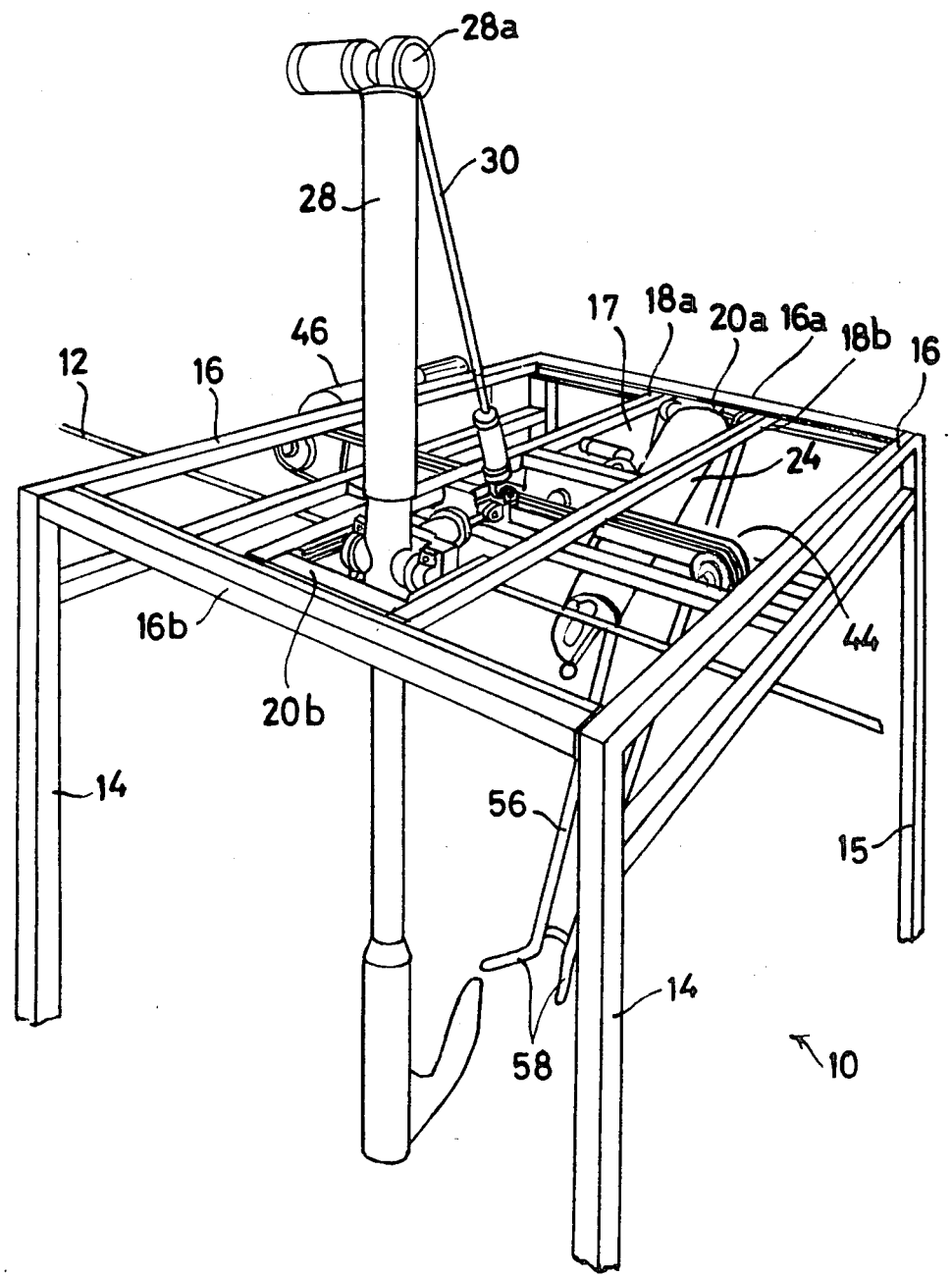
FIG. 1 is a perspective drawing of an installation in which the invention is used.

The installation indicated in its entirety in FIG. 1 by reference numeral 10 is intended to be placed alongside a conveyor track 12, along which the slaughter animals are supplied, each hanging from a slaughter yoke 14, which is known per se. The installation consists of a frame which has vertical posts 15 and horizontal connecting parts 16, and which can enclose the conveyor track 12.

Disposed movable between the horizontal bars 16a, 16b is an auxiliary frame 17, comprising longitudinal bars 18a, 18b and the connecting crossbars 20a, 20b. This auxiliary frame 17 bears, pivoting about a horizontal shaft 22, a cylindrical carrier 24 with drive units (not shown) for the various members and elements yet to be described, and has at the other end, pivoting about the horizontal shaft 26, a vertical cylindrical unit 28, which at the top end 28a is connected by means of the connecting rod 30 and the hydraulic cylinder 32 to the auxiliary frame. The angular position of the unit 28 is adjustable in the vertical plane by means of this cylinder 32. On its bottom side this unit 28 carries a cutting device 34, which is only schematically shown, and is intended for making a cut from the so-called sticking hole through breast and belly; this device is no subject of the present invention and will therefore not be discussed any further here.

As said above, the carcass 40 to be processed hangs from the usual slaughter yoke 14, driven by the conveyor track, and by means of a suitable carrier 42 the auxiliary frame 17 is taken along by this conveyor track over part of the track of the carcass 40 in the direction of movement thereof; during this movement, the various operations on the carcass to be described below are carried out. When these have been completed and the cutting elements are free of the carcass 40, the auxiliary frame 17 is returned by means of the drive chains 44, driven by the drive motor 46, to the initial position shown on the left in FIG. 1. In a practical embodiment this entire cycle time for processing takes around 12 seconds.

The present application relates in particular to the elements needed for making the cut through the pubis 41 and the hams; these elements are located as a functional unit 23 at the end of the carrier unit 24. These elements execute only rotary movements and displacements in the lengthwise direction of the unit 24; the drive elements needed for them are not shown in detail, since they are sufficiently known from the art. In practice, the various movements will be initiated and ended by suitable sensors, which for the sake of simplicity will not be discussed here.

As stated, the unit 24 can pivot about the horizontal shaft 22; the angular position in the vertical plane is set here by means of a hydraulic cylinder 48, accommodated between the pivot point 50 and the shaft 52 hingedly coupled to the unit 24. A suitable support for the carcass 40 in the lateral direction must be ensured when the cutting operation is carried out; in the embodiment shown this is ensured by a supporting bracket 56 with forked end 58, the other end 6 of which can also pivot about the horizontal shaft 22. The position thereof in the vertical plane determines the position of the carcass 40, which is retained at the rear leg end by the supporting bracket 62, so that the carcass is firmly fixed both in the vertical and in the horizontal direction.

The head 24a of the carrier 24 bears the elements, combined into the above-mentioned "functionl unit" 23, which, according to the invention, are used for cutting through the hams.

These parts are (vide FIG. 3) the following:
- a circular cutting knife 70, accommodated in a housing 72, which contains the drive motor for said knife and, by means of guides 73, is guided so that it moves to and fro in the direction of the arrow 75 in the head 24a, under the control of suitable drive means (not shown);
- a sensor 74, made up of two wedge-shaped parts 74a, 74b, which are set up so that they are symmetrical relative to the knife and, by means of the guides 76a, 76b, are guided in the head 24a, and can be driven to and fro by suitable drive means (not shown) in the direction of the arrow 78; and
- a cylindrical protection sleeve 80, fixed to the head 24, in which a cylindrical cutting knife 82 is rotatably guided and concentrically therein, a carrying bar 86, which is movable to and fro in the direction of the arrow 84 and has on its end a positioning ball 88.

The sleeve 80 carries two arms 25a, 25b, which pivot around the axis 27; the respective free ends of these arms each carry a wedge-shaped pressure roller 29a, 29b.

A pressure spring 31 between the bridge piece 33 which interconnects the arms 25a, 25b, and the head 35 of a pin 37 which is connected to a support 39 which is in its turn fixed to the sleeve 80, presses the rollers 29a, 29b upwardly in the direction of the arrow 41.

Figure 3:
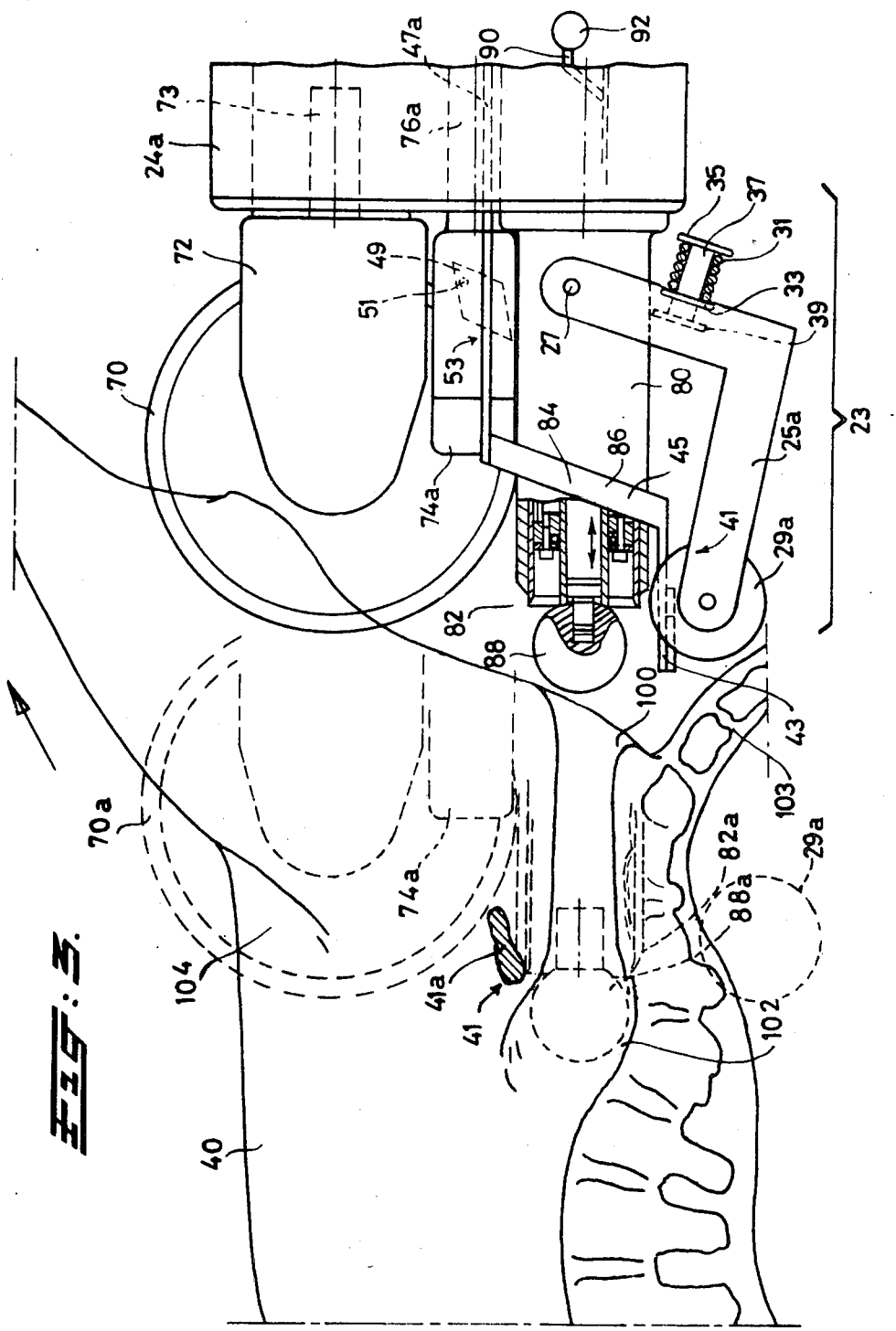
FIG. 3 is a side view of the functional unit, with the various parts thereof.
Figure 4:
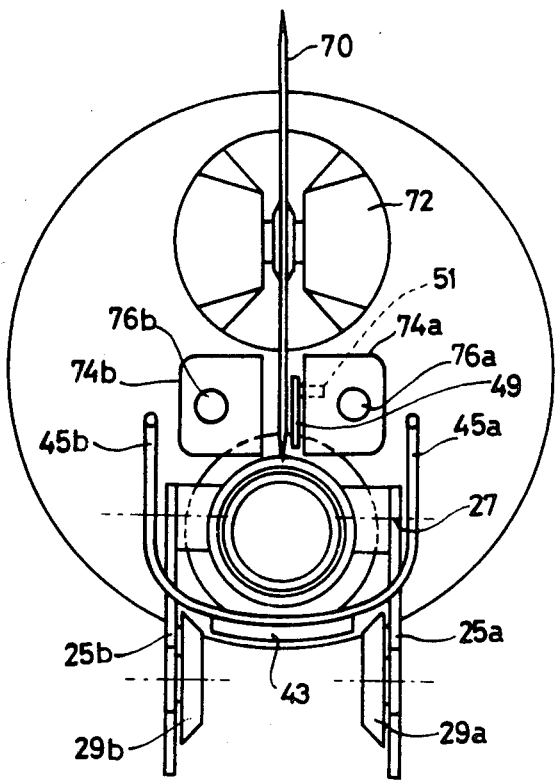
FIG. 4 is an end view of this functional unit.

Furthermore there is a curved pressure strip 43 at the bottom of a U-shaped bow with arms 45a and 45b which each are connected to a guide rod, one of which is shown and denoted with 47a. By suitable means—not shown—the guide rods can be pushed into the position as shown in FIG. 3 which is the position at the start of the operation; thereafter the guide rods can freely move backwards. They are guided in suitable bearings which are not shown.

Finally a small auxiliary knife 49, which can rotate around an axis 51, is positioned between the sensor part 74a and the cutting knife 70; a suitable spring, not shown, presses the knife downwardly in the direction of the arrow 53.

The space inside the cylindrical cutting knife 82 around the carrying bar 86 is connected by means of the schematically shown channel 90 with a source of suction 92, also shown schematically.

Figure 2:
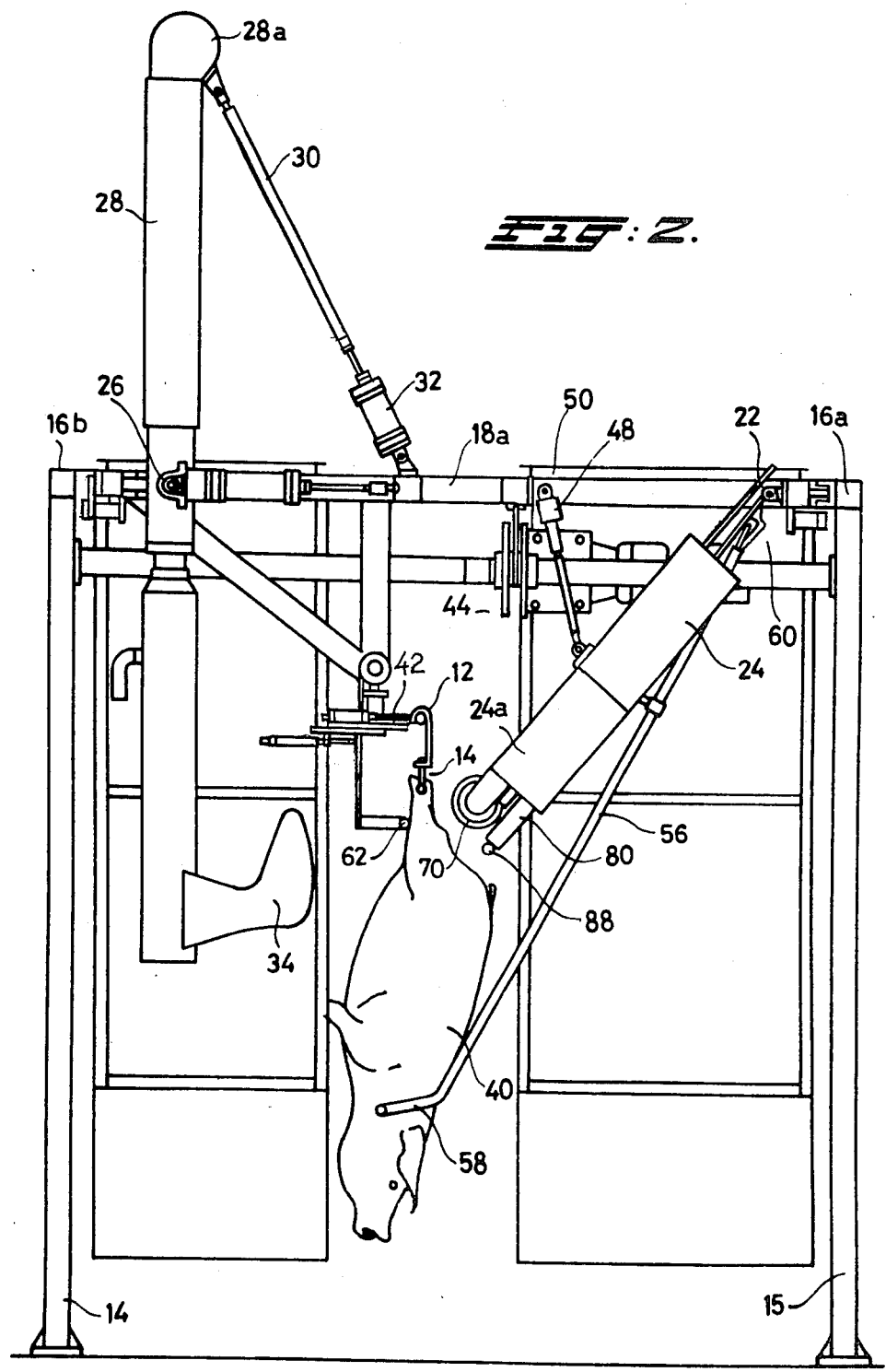
FIG. 2 is a schematic side view of this installation.

The whole device operates as follows:

Starting from the initial position shown by solid lines in FIG. 3—which is also the position shown in FIG. 2—by expansion of the bar 86, the positioning ball 88 is first of all placed in the anus 100 of the carcass 40, up to the position shown by the dot and dash lines 88a. The head 24a follows, pneumatically controlled, this movement, maintaining a specific distance until eventually the cylindrical cutting knife 82, the circular cutting knife 70, and the sensor 74 have reached the position shown by the dot and dash lines 82a, 70a and 74a respectively. Already in the initial position the knife 82 is driven rotatingly with vacuum being created in the space inside the knife, and it thus cuts away the rectum 102 during this movement. The pressure rollers 29a, 29b press against the back of the carcass 40 and thus push the end of the rectum 102, when this is not parallel to the back upwardly, thus ensuring a better positioning with respect to the rotating knife 82. The pressure strip 43 has also moved forwardly and pushes the tail 103 securely out of the path of the knife 102. During this operation the knife 70 is also rotated and cuts the hams 104; the sensor 74 is also pressed forwards and the wedge-shaped front edges 74a, 74b spread the pubis. The cylindrical knife 82 is stopped and at the same time the sensor 74 is moved forwards under adjustable pressure for lateral centering of the pubis 41 thereafter, the housing 72 is moved forwards together with the circular knife 70 until the pubis 41 is entirely cut through on the cartilage-type connecting part 41a of the two pubic bones. The auxiliary spring-loaded knife 49 moves, when it is not restrained by the sleeve 80 anymore, around the axis 51 and ensures with its forward-facing cutting edge that a pubis which is located relatively close to the back of the carcass is securely and totally cut through. The various parts then return to the initial position, where the vacuum is removed.

What is claimed is:

1. Device for cutting through the pubis of the carcass of a slaughter animal, in particular a pig suspended by the legs from a slaughter yoke, comprising a positioning element carried by a bar and to be inserted into the anus by a movement in the lengthwise direction, a first cutting element which is disposed concentrically around it, is displaceable in the lengthwise direction, is rotary, and has an end cutting edge which carries out a circular movement for cutting off the rectum and a second, blade-type, cutting element, also driven in the direction of the anus, for cutting through the pubis, in which the positioning element, the first cutting element and the second cutting element together with a sensor coupled to said second element for locating the pubis position are combined to a functional unit which can be moved in its entirety to and from the carcass, the movement of the positioning element being controllable independently of those of the other elements, in such a way that during the cutting stroke of the cutting blade it remains in the rectum sealing it off.

2. Device according to claim 1, in which the cutting blade which can move independently of the positioning element to and from the carcass is a rotary driven circular cutting blade which is enclosed by wedge-shaped locating cams, tapering towards the blade, movable independently thereof and constituting the sensor.

3. Device according to claim 1, in which the positioning element is ball-shaped.

4. Device according to claim 1, comprising two pressure members, each carried by a tilting arm hinged to the unit and springloaded in the direction of the first cutting element.

5. Device according to claim 1, comprising a pressure strip below the first cutting element, carried by a sliding element guided in the unit for movement to and from the carcass parallel with the movement of the first cutting member.

6. Device according to claim 1, comprising an auxiliary cutting blade parallel with and close to the rotating cutting blade springloaded tiltable around an axis perpendicular to the plane of said cutting blade.

7. Device according to claim 1, in which the front side of the first cutting element is tightly enclosed by a protective sleeve, which is movable jointly therewith to and from the carcass, and that means are provided for the creation of vacuum behind the positioning element and around the carrier the positioning element.

8. Device according to claim 1, in which the functional unit carrying the positioning element and the two cutting elements is disposed in such a way that it is movable in the lengthwise direction, on the end of an oblong carrier, which at the other end is supported in such a way that it can rotate about a horizontal axis and in angular position can be set in the vertical plane, while a supporting bracket is provided thereunder, having one end mounted so as to be rotatable about a horizontal axis and also being adjustable in angular position, the other end enclosing the carcass.

* * * * *